United States Patent [19]

Iffland et al.

[11] 4,122,028
[45] Oct. 24, 1978

[54] PROCESS FOR SOLIDIFYING AND ELIMINATING RADIOACTIVE BORATE CONTAINING LIQUIDS

[75] Inventors: Norbert Iffland, Freigericht; Hans-Jörg Isensee, Bruchköbel; Gerhard Wagner, Rodenbach; Hartmut Witte, Bruchköbel, all of Germany

[73] Assignee: Nukem Nuklear-Chemie und Metallurgie GmbH, Hanau, Germany

[21] Appl. No.: 762,793

[22] Filed: Jan. 25, 1977

[30] Foreign Application Priority Data

Jan. 28, 1976 [DE] Fed. Rep. of Germany ....... 2603116

[51] Int. Cl.² .............................................. G21F 9/16
[52] U.S. Cl. ................................................ 252/301.1 W
[58] Field of Search ................ 252/301.1 W; 423/279; 106/73.6, 98, 76, 78, 74

[56] References Cited

U.S. PATENT DOCUMENTS

| 3,186,791 | 6/1965 | Kloepfer et al. | 423/279 |
|---|---|---|---|
| 3,454,410 | 7/1969 | Schutt et al. | 106/74 |
| 3,507,801 | 4/1970 | Kausz et al. | 252/301.1 W |
| 3,679,595 | 7/1972 | Dollgast | 252/301.1 W |
| 3,988,258 | 10/1976 | Curtiss et al. | 252/301.1 W |

FOREIGN PATENT DOCUMENTS

1,246,848 10/1960 France .............................. 252/301.1 W

OTHER PUBLICATIONS

Nuclear Science Abstracts, vol. 24, Abstract No. 22311 (May 31, 1973).
Nuclear Science Abstracts, vol. 27, Abstract No. 22312 (May 31, 1973).

*Primary Examiner*—Benjamin R. Padgett
*Assistant Examiner*—Deborah L. Kyle
*Attorney, Agent, or Firm*—Cushman, Darby & Cushman

[57] ABSTRACT

There is provided a process for the solidification of radioactive boron containing aqueous solutions and suspensions containing more than 5% boric acid or a borate and more than 5% solids by addition of suitable additions in the correct sequence to form solid, transportable and storable blocks by using as the additive first 5 to 30 parts by weight of slaked lime and then 30–80 parts by weight of cement per 100 parts by weight of radioactive solution.

8 Claims, 1 Drawing Figure

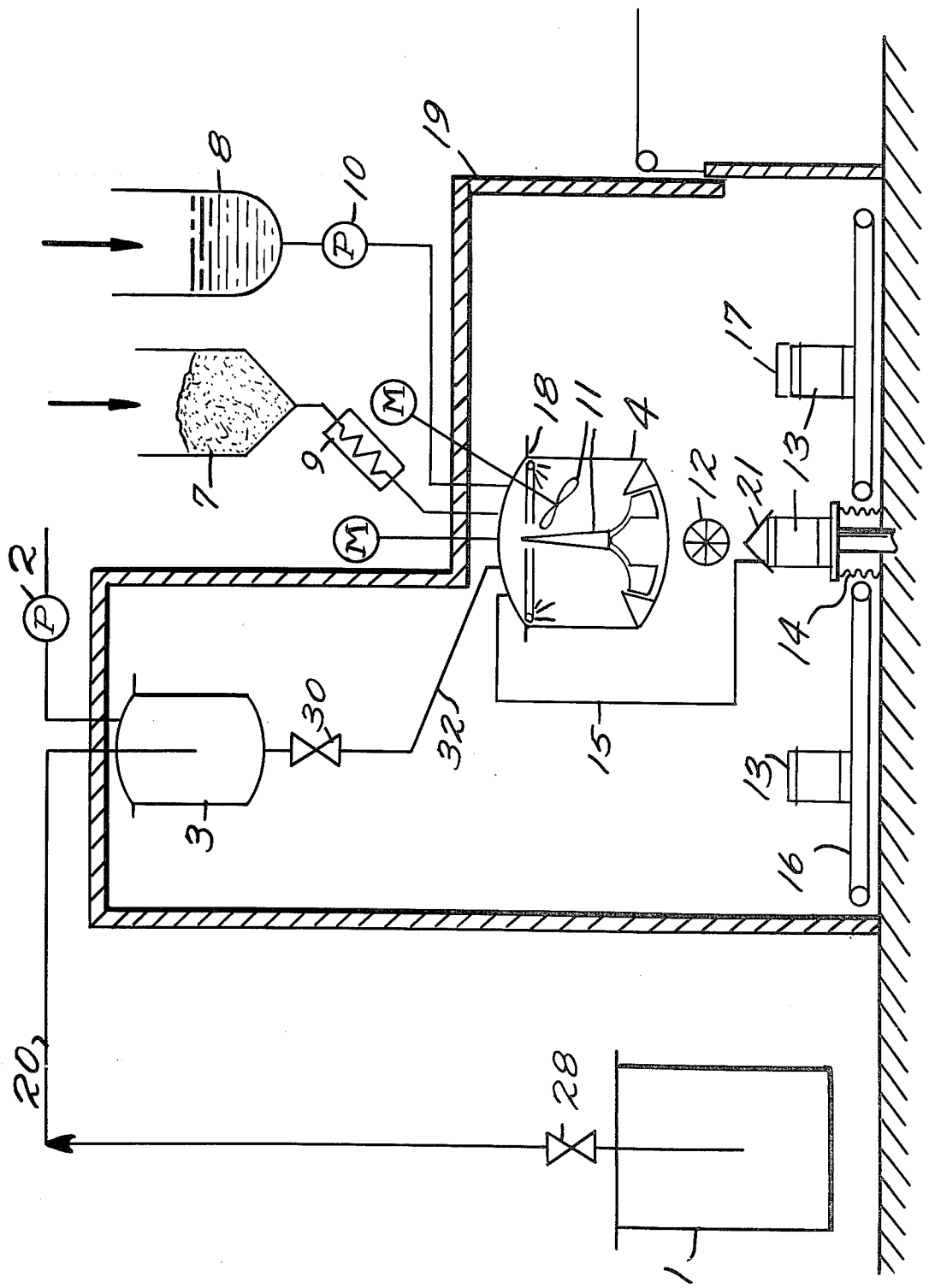

PROCESS FOR SOLIDIFYING AND ELIMINATING RADIOACTIVE BORATE CONTAINING LIQUIDS

BACKGROUND OF THE INVENTION

The invention is directed to a process for the solidification and elimination of radioactive borate containing solutions and suspensions, which accumulate as evaporator concentrates in the operation of pressurized water reactors, by the addition of liquid or solid additives which make possible a setting of the hydraulic binder which is also added.

The cementing of radioactive waste liquids is known as a suitable and approved process for conversion into a solid, transportable and final storable form. However, it has been found problematical for solutions containing more than 5% of solid substances and more than 5% boric acid or borate because cracked and crumbly compositions form and the liquid frequently is not completely set.

Furthermore, it is known (ASME Publication 74-WA/NE-9) that borate containing solutions and suspensions cannot be hardened to compact blocks by mere addition of cement. In the literature (ASME Publication 74-WA/NE-9), the addition of water glass is recommended but with solutions of (a) more than 5% borate component and (b) suspensions with more than 5% solids this does not lead to the desired result.

Therefore, there has already been proposed a process of treating the radioactive borate containing solutions with bone glue, drying on heated rolls with the addition of polyacrylamide and pressing the rolled stock, see Döllgast, German Pat. No. 17, 64, 586. In this manner solid substances can be produced, but in the drying waste gas problems develop because of the escaping vapor.

Furthermore, it has been proposed to evaporate borate containing waste solutions to such an extent that the remaining water is bound as water of crystallization, Kausz, German Pat. No. 17, 67, 184. Thereby waste gas problems likewise occur and besides, the sodium borate formed is not stable to leaching.

Therefore, it was the problem of the present invention to find a process for the solidification and elimination of borate containing aqueous liquids having a borate content above 5% and a solids content above 5% which permits the production of compact, transportable and final storable waste substances without requiring evaporation and drying steps in order to avoid the waste gas and waste water problems and also completely binds the aqueous liquid by additives.

SUMMARY OF THE INVENTION

This problem was solved by the invention by adding to 100 parts by weight of the radioactive, boron containing aqueous solution first 5–30 parts by weight of slaked lime and them 30–80 parts by weight of cement, i.e., Portland cement. Thereby there can be replaced up to 30% of the cement portion by addition of 5–30 parts by weight of silica and/or kieselguhr per 100 parts by weight of solution. An increased strength, accelerated setting and a better resistance to leaching of the waste substance is obtained if there is added 3–30 parts by weight of water glass and especially 1–15 parts by weight of phosphoric acid or hydrogen phosphate, e.g., sodium hydrogen phosphate or potassium hydrogen phosphate, in each case based on 100 parts by weight of the liquid to be eliminated.

The process of the invention is advantageously suited for aqueous solutions which contain 5–25% of borate, especially 15%, and 5–30% of solids, especially 20%. The borate is usually present as sodium borate, but may be present as potassium borate or boric acid.

Unless otherwise indicated all parts and percentages are by weight.

The addition of lime apparently leads to the formation of low soluble calcium borates, while the cement is indispensable as hydraulic binder for development of mechanical strength. The addition of water glass causes a better and quicker cross-linking and is also advantageous through the formation of high polymer mixed borate-silicate-anions, however, by itself in combination with cement only in none of the investigated cases it is sufficient to cause solidification. The known use of silica or kieselguhr as water binding fillers likewise only in combination with other additives leads to a better compacted block. By addition of phosphoric acid or hydrogen phosphates there is produced a definite acceleration of the solidification process and a reduction of the total amount of additive. The reasons for this are the ability of the phosphate to form polymeric anions and its buffering properties.

BRIEF DESCRIPTION OF THE DRAWINGS

The process of the invention will be understood best in connection with the drawings wherein the single FIGURE shows in schematic form a suitable apparatus for carrying out the process.

Referring more specifically to the drawings, radioactive solution or suspension collected in storage tank 1 was sucked into supply vessel 3 with the aid of pump 2 via valve 28 and line 20. It is possible to arrange pump 2 in line 20, but on account of the contamination problem the indirect sucking as indicated in the drawings is more advantageous. The solution or suspension is discharged batchwise from the supply vessel 3 via valve 30 and line 32 to mixing container 4. Here there are added the additives either in prepackaged amounts or individually from storage containers 7 and 8. Solid additives can be supplied with the metering screw 9, liquids with a metering pump 10. In each case after addition of a component a completely homogeneous mixture is produced with the stirrer system 11, only then can the next addition take place. After the stirring in of all additives there is present a highly viscous composition, which, however, still has good flowability (thixotropy) with mechanical movement and can be emptied into an available drum 13 by use of a suitable discharging apparatus 12, for example, a bucket wheel lock. This drum 13 is forced on the inlet system 21 for filling by employing the pressure mechanism 14. The equalization of pressure takes place via gas compensation pipe 15. The filled drum 13 is conveyed further with the transportation apparatus 16 and closed with a cover 17. The inserted composition solidifies within several days to a compact block, after about 3 to 4 weeks the final mechanical strength is reached.

After each used up bell jar (drum) the mixing vessel 4 is sprayed strongly with water from ring nozzle 18, the resulting spray water mixed with cement and transported in drums. By several repetitions, there is attained a decontamination of mixing container 4, stirring system 11 and discharge system 12.

Supply vessel 3, mixing container 4 and the apparatus for filling and closing the drums are disposed behind a screen 19.

In the working up of small amounts, particularly weakly active waste waters, it can be advantageous to employ the proposed drum 13 itself as the mixing container. In this case, the stirrer can be less expensively laid out and the discharge apparatus eliminated. The contaminated stirrer is then put into the last drum of the solidification campaign.

DESCRIPTION OF THE PREFERRED EMBODIMENTS

The use of the process is explained in the following examples:

EXAMPLE 1

From the supply vessel 3 there were drained off into the 500 liter mixing container 4 200 liters, corresponding to 250 kg of radioactive borate (sodium borate) containing evaporator concentrate, wherein the concentrate contained 15% borate and 20% solids.

There were introduced via metering screw 9 40 kg of slaked lime and it was stirred in with the stirrer system. After the resulting complete mixing via another supply system there were added and likewise stirred in 120 kg of Portland cement. Next via the metering pump 10 there were brought in 40 kg of potassium water glass (28–30° Bé). The mixture was homogenized by continuous stirring and subsequently with the aid of bucket wheel lock 12 filled with 3–100 liter drums.

During the emptying process there was continuous stirring in order to maintain the mixture flowability.

The filled drums were transportable after about 24 hours because the thixotropic composition until then is solidified.

EXAMPLE 2

There were stirred into a 100 liter drum 50 liters, corresponding to 63 kg of radioactive borate containing (sodium borate) evaporator concentrate with a borate content of 5% and a solids portion of 30% 10 kg of calcium hydroxide (slaked lime). After complete homogenization, there were mixed in succession 30 kg of iron-Portland cement, 5 kg of kieselguhr and 10 kg of sodium water glass (about 38° Bé). The volume then amounted to about 77 l. The mixture solidified in the drum at room temperature within about 20 hours and reached the complete mechanical final strength after 2 to 4 weeks.

EXAMPLE 3

There were placed in the mixing container 4 via the supply container 3 200 liters of evaporator concentrate with a borate (sodium borate) content of 25% and a solids portion of 10%. With the aid of metering screw 9 there were added 100 kg of slaked lime. Afte complete intimate mixing with the stirrer system 11 there were added 100 kg of blast-furnace cement (consisting of Portland cement and finely ground blast-furnace slag) via a second supply system. With continuous stirring there was formed after about 10 minutes a readily flowable composition which was conveyed via the bucket wheel lock 12 into available 100 liter drums. The drawn off mixture (final volume about 300 liters) was solid after 2 to 3 days and hardened in 1–2 months to solid blocks.

EXAMPLE 4

50 liters of borate (sodium borate) containing evaporator concentrate containing 12% borate and 18% solids in an 100 liter drum were treated with 10 kg of lime and intensively mixed. Then there were stirred in succession 20 kg of Portland cement, 6 kg of water glass and 6 kg of phosphoric acid (65%). The mixture warmed itself up to about 40° to 50° C. upon addition of the phosphoric acid. The mixture with a volume of about 65 liters solidified at room temperature after several hours and after about 1 to 2 weeks formed a solid block.

What is claimed is:

1. A process for the solidification of radioactive boron containing aqueous solutions or suspensions containing more than 5% of boric acid or borate and more than 5% solids to form a solid, transportable, storage stable block by adding suitable compounds in the correct sequence comprising adding to 100 parts by weight of said radioactive solution first 5–30 parts by weight of quick lime and then adding 30 to 80 parts by weight of cement.

2. A process according to claim 1 wherein there are employed 5 to 25% of boric acid or borate and 5 to 30% of solids based on the radioactive solution or suspension.

3. A process according to claim 2 wherein there are employed 15% of boric acid or borate and 20% of solids.

4. A process according to claim 1 wherein there are also added 5–30 parts by weight of water glass.

5. A process according to claim 1 wherein up to 30% of the cement is replaced by adding 5 to 30 parts by weight of silica, kieselguhr or a mixture of silica and kieselguhr per 100 parts by weight of reactive solution or suspension.

6. A process according to claim 1 wherein there are also added 1 to 15 parts by weight of phosphoric acid or sodium or potassium hydrogen phosphate.

7. A process according to claim 6 wherein there is employed phosphoric acid.

8. A process according to claim 1 wherein there are employed per 100 parts by weight of radioactive solution or suspension first 5 to 30 parts by weight of lime, then 20–70 parts by weight of cement, then 5–20 parts by weight of water glass and finally 1 to 15 parts by weight of phosphoric acid or sodium or potassium hydrogen phosphate.

* * * * *